US010477515B2

(12) United States Patent
Karaki et al.

(10) Patent No.: US 10,477,515 B2
(45) Date of Patent: Nov. 12, 2019

(54) SELECTIVE USAGE OF SCHEDULED AND UNSCHEDULED TRANSMISSIONS TO A CELLULAR NETWORK

(71) Applicant: Telefonaktiebolaget LM Ericsson (publ), Stockholm (SE)

(72) Inventors: Reem Karaki, Aachen (DE); Torsten Dudda, Aachen (DE); Mai-Anh Phan, Herzogenrath (DE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 265 days.

(21) Appl. No.: 14/915,303

(22) PCT Filed: Mar. 23, 2015

(86) PCT No.: PCT/EP2015/056088
§ 371 (c)(1),
(2) Date: Feb. 29, 2016

(87) PCT Pub. No.: WO2016/150479
PCT Pub. Date: Sep. 29, 2016

(65) Prior Publication Data
US 2017/0041901 A1  Feb. 9, 2017

(51) Int. Cl.
*H04W 72/02* (2009.01)
*H04W 28/08* (2009.01)
(Continued)

(52) U.S. Cl.
CPC .......... *H04W 72/02* (2013.01); *H04W 28/08* (2013.01); *H04W 48/18* (2013.01);
(Continued)

(58) Field of Classification Search
CPC ........................ H04W 28/065; H04W 72/02
(Continued)

(56) References Cited

U.S. PATENT DOCUMENTS 8,767,536 B2 * 7/2014 Himayat ............. H04W 28/065
370/230
2014/0192642 A1 * 7/2014 Medapalli ............. H04W 48/18
370/230

FOREIGN PATENT DOCUMENTS

EP        2706790 A1      3/2014
WO    2015023449 A2      2/2015
WO    2016034193 A1      3/2016

OTHER PUBLICATIONS

3GPP, "3rd Generation Partnership Project; Technical Specification Group Radio Access Network; Evolved Universal Terrestrial Radio Access (E-UTRA); Medium Access Control (MAC) protocol specification (Release 12)", 3GPP TS 36.321 V12.3.0 (Sep. 2014), Sep. 2014, 1-57.
(Continued)

*Primary Examiner* — Joel Ajayi
(74) *Attorney, Agent, or Firm* — Patent Portfolio Builders, PLLC

(57) ABSTRACT

A communication device (10) detects a need to transmit data to an access node (100) of a cellular network. In response to detecting this need, the communication device (10) performs a selection between a scheduled transmission of the data to the access node (100) and an unscheduled transmission of the data to the access node (100). In case of the scheduled transmission, the communication device (10) requests allocation of radio resources by the cellular network, in response to this requesting, receives an indication of allocated radio resources from the cellular network, and performs a radio transmission on the allocated radio resources to send the data to the access node (100). In case of the unscheduled transmission, the communication device (10) performs a radio transmission on further radio resources to send the data to the access node (100), without requesting allocation of radio resources by the cellular network.

32 Claims, 9 Drawing Sheets

(51) Int. Cl.
*H04W 48/18* (2009.01)
*H04W 88/06* (2009.01)
*H04W 72/04* (2009.01)
*H04W 72/10* (2009.01)
*H04W 84/04* (2009.01)
*H04W 84/12* (2009.01)
*H04W 74/08* (2009.01)

(52) U.S. Cl.
CPC ........ *H04W 72/0486* (2013.01); *H04W 72/10* (2013.01); *H04W 74/085* (2013.01); *H04W 84/042* (2013.01); *H04W 84/12* (2013.01); *H04W 88/06* (2013.01)

(58) Field of Classification Search
USPC ......................................................... 455/453
See application file for complete search history.

(56) References Cited

OTHER PUBLICATIONS

3GPP, "3rd Generation Partnership Project; Technical Specification Group Radio Access Network; Evolved Universal Terrestrial Radio Access (E-UTRA); Packet Data Convergence Protocol (PDCP) specification (Release 12)", 3GPP TS 36.323 V12.1.0 (Sep. 2014), Sep. 2014, 1-28.

3GPP, "3rd Generation Partnership Project; Technical Specification Group Radio Access Network; Study on Small Cell enhancements for E-UTRA and E-UTRAN; Higher layer aspects (Release 12)", 3GPP TR 36.842 V12.0.0 (Dec. 2013), Dec. 2013, 1-71.

3GPP, "3rd Generation Partnership Project; Technical Specification Group Services and System Aspects; IP flow mobility and seamless Wireless Local Area Network (WLAN) offload; Stage 2 (Release 12)", 3GPP TS 23.261 V12.0.0 (Sep. 2014), Sep. 2014, 1-22.

3GPP, "3rd Generation Partnership Project; Technical Specification Group Services and System Aspects; Study on Wireless Local Area Network (WLAN) network selection for 3GPP terminals; Stage 2 (Release 12)", 3GPP TR 23.865 V12.1.0 (Dec. 2013), Dec. 2013, 1-46.

Unknown, Author, "LCR TDD: Non-Scheduled Traffic and Scheduled Traffic Transmissions", 3GPP TSG RAN WG1 #46bis R1-062969 Seoul, Korea Source: ZTE, Oct 9-13, 2006, 1-4.

Unknown, Author, "Non-Scheduled Transmission for HSUPA", 3GPP TSG-RAN WG2 Meeting #46 R2-050332 Scottsdale, U.S.A. Source: Nokia, Feb. 14-18, 2005, 1-4.

Unknown, Author, "RAN-ANDSF Interworking", 3GPP TSG—RAN WG2 #83bis Tdoc R2-133440 Ljubljana, Slovenia Source: Ericsson, Oct. 7-11, 2013, 1-6.

Unknown, Author, "Way forward for WLAN/3GPP Radio interworking", 3GPP TSG-RAN WG2 #83 Tdoc R2-132827 Barcelona, Spain Source: Ericsson, ST-Ericsson, Aug. 19-23, 2013, 1-8.

\* cited by examiner

SELECTIVE USAGE OF SCHEDULED AND UNSCHEDULED TRANSMISSIONS TO A CELLULAR NETWORK

TECHNICAL FIELD

The present invention relates to methods for controlling radio transmissions in a cellular network and to corresponding devices.

BACKGROUND

In the LTE (Long Term Evolution) radio technology specified by 3GPP (3$^{rd}$ Generation Partnership Project) a UE (user equipment) may utilize dual connectivity for achieving enhanced performance of data transmission between the UE and a cellular network. In the case of dual connectivity, the UE may simultaneously utilize two radio links for sending and/or receiving data. Such dual connectivity features are for example discussed in 3GPP TR 36.842 V12.0.0 (December 2013).

Further, it is also known to combine a cellular radio link, such as an LTE radio link, with a WiFi radio link. For example, 3GPP TS 23.261 V12.0.0 (September 2014) describes a seamless Wireless Local Area Network (WLAN) offloading mechanism, which may be used by a UE to simultaneously connect to a 3GPP access and a WLAN access and transmit some IP (Internet Protocol) flows (e.g., best effort traffic) over the WiFi radio link and the WLAN access to the Internet while other IP flows (e.g., traffic with specific QoS requirements) are transmitted via the cellular radio link. In this case, the distribution of the traffic over the different radio links is organized on the IP layer. For example, this means that a first IP flow from the UE to a certain IP destination address would be routed via the WiFi radio link, while a second IP flow from the UE to another IP destination address would be routed via the cellular radio link.

The cellular radio link may be regarded as a scheduled link. That is to say, radio resources used by the cellular radio link are controlled by the cellular network. For example, as specified in 3GPP TS 36.321 V12.3.0 (September 2014) for the LTE radio technology, the UE may need to request allocation of radio resources by the eNB before it can transmit data on the LTE radio link. The allocation of resources may be requested explicitly by sending a scheduling request (SR) or implicitly by sending a buffer status report (BSR). The BSR may be included in an uplink transmission of data and indicates an amount of uplink data which still needs to be transmitted by the UE. The eNB indicates the allocated radio resources by sending an uplink grant to the UE, and the UE transmits the data by performing a radio transmission on the allocated radio resources.

As compared to that, the WiFi radio link may be regarded as an unscheduled link where the UE can transmit data without requesting allocation of resources. In the case of the WiFi link, a contention based mechanism is applied for handling colliding radio transmissions on radio resources shared by multiple devices.

In view of better utilizing different available access technologies, it may be desirable to more closely aggregate a cellular radio link and a WiFi radio link, e.g., in such a way that also traffic of the same IP flow may be distributed over different radio links. However, since the cellular radio link is a scheduled link while the WiFi radio link is an unscheduled link, this is not straightforward. For example, the cellular radio link and the WiFi radio link may have different characteristics concerning latency or throughput performance, and such characteristics may also depend on various conditions.

Accordingly, there is a need for techniques which allow for efficiently combining scheduled transmissions and unscheduled transmissions.

SUMMARY

According to an embodiment of the invention, a method of controlling radio transmissions in a cellular network is provided. According to the method, a communication device detects a need to transmit data to an access node of the cellular network. In response to detecting this need, the communication device performs a selection between a scheduled transmission of the data to the access node and an unscheduled transmission of the data to the access node. In case of the scheduled transmission, the communication device requests allocation of radio resources by the cellular network, in response to this requesting, receives an indication of allocated radio resources from the cellular network, and performs a radio transmission on the allocated radio resources to send the data to the access node. In case of the unscheduled transmission, the communication device performs a radio transmission on further radio resources to send the data to the access node, without requesting allocation of radio resources by the cellular network.

According to a further embodiment of the invention, a communication device is provided. The communication device comprises at least one radio interface and at least one processor. The at least one processor is configured to detect a need to transmit data via the radio interface to an access node of a cellular network and, in response to detecting this need, perform a selection between a scheduled transmission of the data to the access node and an unscheduled transmission of the data to the access node. Further, the at least one processor is configured to, in case of the scheduled transmission, request allocation of radio resources by the cellular network, in response to this requesting, receive an indication of allocated radio resources from the cellular network, and perform a radio transmission on the allocated radio resources to send the data to the access node. Further, the at least one processor is configured to, in case of the unscheduled transmission, perform a radio transmission on further radio resources to send the data to the access node, without requesting allocation of radio resources by the cellular network.

According to a further embodiment of the invention, a computer program or computer program product is provided, e.g., in the form of a non-transitory storage medium, which comprises program code to be executed by at least one processor of a communication device. Execution of the program code causes the at least one processor to detect a need to transmit data to an access node of a cellular network and, in response to detecting this need, perform a selection between a scheduled transmission of the data to the access node and an unscheduled transmission of the data to the access node. Further, execution of the program code causes the at least one processor to, in case of the scheduled transmission, request allocation of radio resources by the cellular network, in response to this requesting, receive an indication of allocated radio resources from the cellular network, and perform a radio transmission on the allocated radio resources to send the data to the access node. Further, execution of the program code causes the at least one processor to, in case of the unscheduled transmission, perform a radio transmission on further radio resources to send the data to the access node, without requesting allocation of radio resources by the cellular network.

Details of such embodiments and further embodiments will be apparent from the following detailed description of embodiments.

DETAILED DESCRIPTION OF EMBODIMENTS

Figure 1:
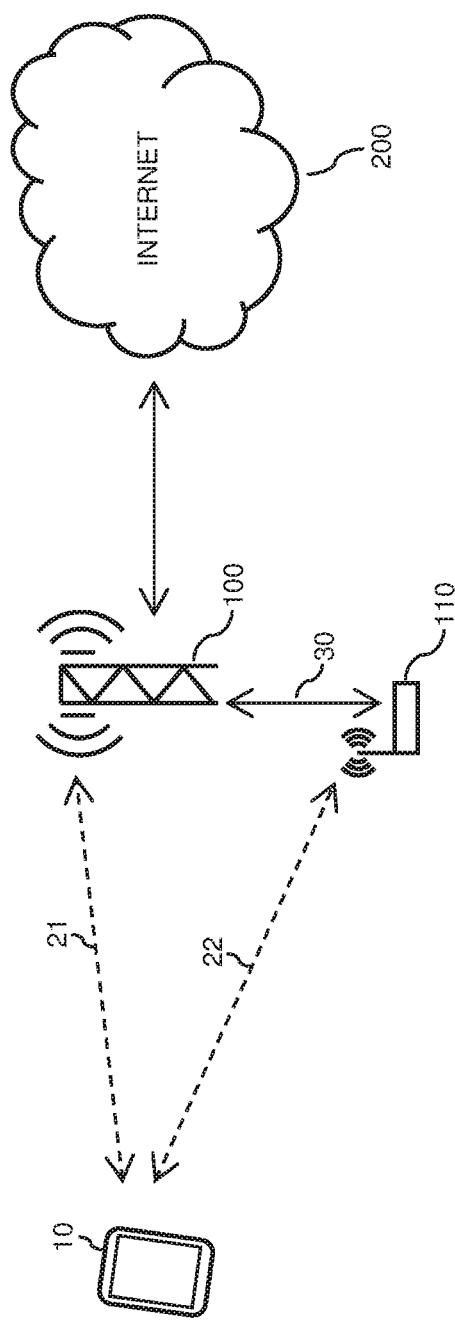
FIG. 1 schematically illustrates an exemplary scenario in which scheduled transmissions and unscheduled transmissions may are combined according to an embodiment of the invention.

In the following, concepts in accordance with exemplary embodiments of the invention will be explained in more detail and with reference to the accompanying drawings. The illustrated embodiments relate to control of radio transmissions between from a communication device, e.g., a UE, to a cellular network. Specifically, the illustrated examples assume that the radio transmissions may be performed by scheduled transmissions and unscheduled radio transmissions. The cellular network may for example be based on the LTE radio technology. The scheduled transmissions are performed on radio resources allocated by the cellular network in response to the communication device explicitly or implicitly requesting the allocation of resources, e.g., a described in 3GPP TS 36.321 V12.3.0 (September 2014). The unscheduled transmissions are performed without requiring requesting of radio resources by the communication device, e.g., on a WiFi radio link or on radio resources which were allocated beforehand to the communication device, e.g., by semi-persistent scheduling as described in 3GPP TS 36.321 V12.3.0 (September 2014). However, it is to be understood that the illustrated concepts could also be applied in connection with other radio technologies, e.g., other cellular radio technologies, e.g., UMTS (Universal Mobile Telecommunications System) a 5G ($5^{th}$ Generation) cellular radio technology.

In the illustrated concepts, the communication device detects a need to transmit data and, in response to detecting this need, performs a selection between utilizing a scheduled transmission for transmitting the data to an access node of the cellular network, e.g., to a base station, and utilizing an unscheduled transmission for transmitting the data to the access node. Accordingly, the selection may be performed individually for each data element which needs to be transmitted, e.g., for each IP data packet or similar protocol data unit. The selection may be based on various criteria. For example, the communication device may base the selection on a delay associated with the scheduled transmission and a delay associated with the unscheduled transmission. In some situations, selecting the unscheduled transmission may be preferable because it allows for avoiding a latency contribution due to the requesting of allocation of radio resources, performing the allocation of the radio resources, and indicating the allocated radio resources to the communication device. In other situations, selecting the scheduled transmission may be preferable because the unscheduled transmission is delayed by a need to transmit the data via a backhaul link to the access node, e.g., a backhaul link between the access node of the cellular network and a WLAN access point receiving the radio transmission from the communication device and. This may also apply in other scenarios where the unscheduled transmission is performed via a further access node receiving the radio transmission from the communication device. Further, in some scenarios the scheduled transmission may also be preferable because a medium for performing the radio transmission of the unscheduled transmission may be highly loaded, resulting in a high likelihood of the unscheduled transmission being unsuccessful. Further, in some scenarios the scheduled transmission may be preferable because the medium for performing the radio transmission of the unscheduled transmission is shared for both downlink transmissions from the cellular network to the communication device and uplink transmissions from the communication device to the cellular network, and selecting the unscheduled transmission therefore may have the effect that the throughput of the downlink transmissions is reduced.

FIG. 1 schematically illustrates a scenario of combining scheduled transmissions and unscheduled transmissions from the communication device, which in FIG. 1 is assumed to be a UE 10, to the cellular network. In the scenario of FIG. 1, the scheduled transmissions are performed via a cellular radio link 21 to a base station 100 of the cellular network, while the unscheduled transmissions are performed via a WiFi radio link 22 to a WLAN access point. The base station 100 and the WLAN access point 110 are connected by a backhaul link 30. Accordingly, the scheduled transmissions are routed from the UE 10 via the cellular radio link 21 to the base station 100, and the unscheduled transmissions are routed from the UE 10 via the WiFi radio link 22 and the backhaul link 30 to the base station 100. At the base station 100 the data received in the scheduled transmissions and the unscheduled transmissions may be combined. From the base station 100, the data received in the scheduled transmissions and the unscheduled transmissions may also be forwarded to a certain destination, e.g., a destination in the Internet 200. In the scenario of FIG. 1, the base station 100 may be regarded as a master access node and the WLAN access point may be regarded as a slave access node.

As mentioned above, the scheduled transmission via the cellular radio link 21 involves that the UE 10 requests allocation of radio resources by the cellular network. When assuming the LTE radio technology, the scheduled transmission may work as follows: When data is available for transmission at the UE 10, e.g., are received in a transmit buffer on the MAC (Medium Access Control) layer, the UE 10 indicates this to the base station 100, in the LTE terminology referred to as eNB. This may be accomplished by sending a SR. Based on the SR, the base station 100 allocates radio resources for an initial radio transmission by the UE 10 and indicates these resources in an UL (uplink) grant transmitted to the UE 10. The UL grant is valid for only a specific TTI (Transmission Time Interval), i.e., only for on radio transmission. On the indicated radio resources, the UE 10 then performs a radio transmission with at last a part of the available data to the base station 100. In this radio transmission the UE 10 also includes a BSR indicating the amount of data still remaining after this radio transmission. Accordingly, if the initially allocated radio resources were not sufficient to transmit all the data, the base station 100 will recognize this from the BSR and, in response to the BSR, allocate further radio resources for a further radio transmission by the UE 10 and indicate these radio resources in a further UL grant to the UE 10. On these radio resources, the UE 10 may then perform a further radio transmission to transmit at least a part of the still remaining data and a further BSR. This process may be continued until no more data are available for transmission at the UE 10. In some scenarios, the radio resources allocated for the initial radio resources may be sufficient for transmitting only the BSR, which means that transmission of the data may actually start with the further radio transmission. A typical delay which can be expected between data becoming available for transmission at the UE 10 and receipt of the first radio transmission of the data at the base station 100 may thus be about 16 ms. In some cases, the UE 10 may also be not RRC (Radio Resource Control) connected when the data become available for transmission. The UE 10 may need to perform random access procedure to become RRC connected before it can send the SR. This may even further increase the experienced delay.

In the case of the unscheduled transmission via the WiFi radio link 22, the UE 10 may perform a radio transmission without beforehand requesting allocation of radio resources. The UE 10 may rather use UE based mechanisms for deciding when it can access the medium to perform the radio transmission. Such mechanisms may for example be contention-based, such as the DCF (Distributed Coordination Function) mechanism specified in the IEEE 802.11 standards, which is a form of carrier sense multiple access with collision avoidance (CSMA/CA). According to the DCF mechanism, the UE 10 first needs to sense the medium before it can access the medium. When the medium is free, the UE 10 waits for a DCF Interframe Spacing (DIFS) before it performs the radio transmission. If the medium is busy, the UE 10 waits until the medium is idle and for the DIFS, which is also referred to as access deferral. With the purpose of collision avoidance, the UE 10 further waits for a variable backoff time. For the access deferral, the DCF mechanism utilizes information it typically obtains from received radio transmissions that other stations occupying the medium are sending. In a control field of a frame used in these radio transmissions, a duration field indicates how long the sending station will require the medium. The duration field enables stations to reserve the medium for subsequent radio transmissions. Before attempting the radio transmission, the UE 10 waits until the time indicated by the duration field of the last received radio transmission has expired. If at this time no radio transmission by another station is sensed, the UE 10 may perform the radio transmission. Accordingly, a radio transmission on the WiFi radio link 22 may in some cases be performed with minimal delay because there is no need to request allocation of radio resources. However, in other cases a significant delay may be experienced when the medium is busy.

Figure 2:
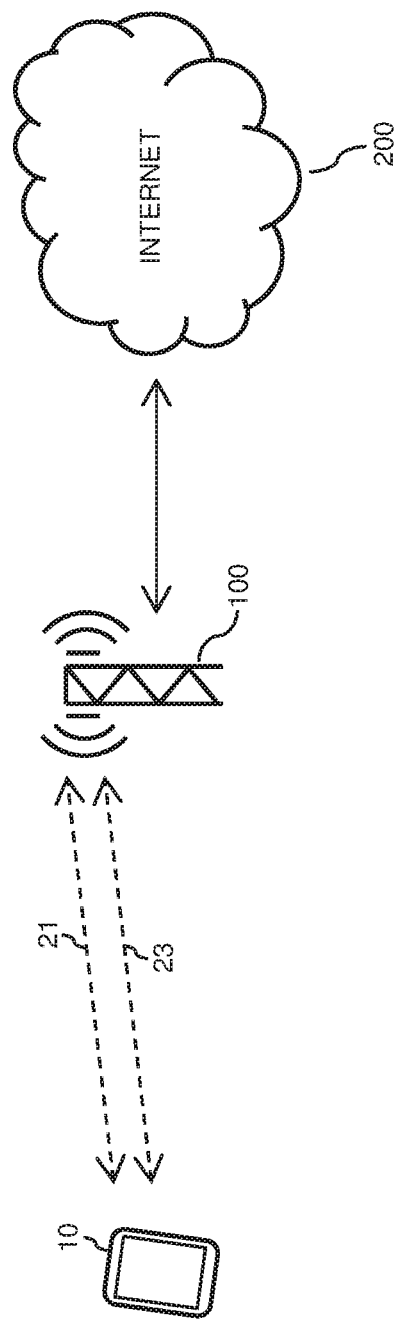
FIG. 2 schematically illustrates a further exemplary scenario in which scheduled transmissions and unscheduled transmissions may are combined according to an embodiment of the invention.

FIG. 2 schematically illustrates a further scenario of combining scheduled transmissions and unscheduled transmissions from the communication device, which in FIG. 2 is assumed to be a UE 10, to the cellular network. Also in the scenario of FIG. 2 the scheduled transmissions are performed via the cellular radio link 21 to a base station 100 of the cellular network, using mechanisms as explained in connection with FIG. 1. The unscheduled transmissions are performed via a further cellular radio link 23 to the base station 100. The scheduled transmissions are routed from the UE 10 via the cellular radio link 21 to the base station 100, and the unscheduled transmissions are routed from the UE 10 via the further cellular radio link 23 to the base station 100. At the base station 100 the data received in the scheduled transmissions and the unscheduled transmissions may be combined. From the base station 100, the data received in the scheduled transmissions and the unscheduled transmissions may also be forwarded to a certain destination, e.g., a destination in the Internet 200.

As compared to the radio transmissions on the cellular radio link 21, the radio transmissions on the further cellular radio link 23 are performed on radio resources which are allocated to the UE 10 already before data become available for transmission at the UE 10. For example, such radio resources may be allocated to the UE 10 by a long lasting UL grant which, in contrast to the above-mentioned UL grant, is valid for multiple TTIs, i.e., for multiple radio transmissions. For example, the long lasting UL grant may be valid for a sequence of consecutive TTIs or in TTs defined according to a certain time pattern. An example of such long lasting UL grant is the SPS grant defined in 3GPP TS 36.321 V12.3.0 (September 2014). Also in this case, a radio transmission on the further cellular radio link 23 may in some cases be performed with minimal delay because there is no need to request allocation of radio resources. On the other hand, the amount of data which can be transferred on the further cellular radio link is typically limited because excessive allocation of radio resources to the UE 10 before knowing the actually needed amount of radio resources may result in inefficient utilization of the radio resources. For example, utilization of such radio resources by other UEs would typically not be possible.

Figure 3:
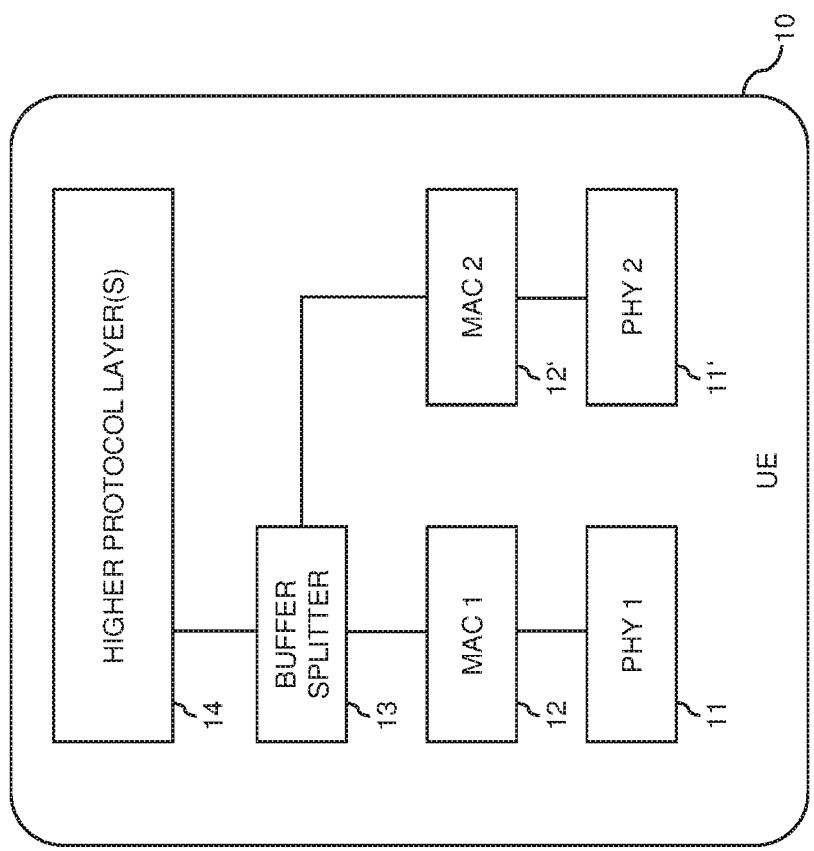
FIG. 3 shows an example of a UE side protocol stack architecture according to an embodiment of the invention.

FIG. 3 schematically illustrates an exemplary protocol architecture which may be applied in the UE 10. In this example, the UE 10 is provided with a protocol stack organized in a first physical layer (PHY) 11 for the cellular radio link 21, a first MAC layer 12 for the cellular radio link 21, a second PHY 11' for the WiFi radio link 22 or the further cellular radio link 23, a 30 second MAC layer 12 for the WiFi radio link 22 or the further cellular radio link 23, a buffer splitter 13, and higher protocol layers 14. The higher protocol layers 14 may for example be based on the Internet Protocol, various transport protocols, such as TCP (Transmissions Control Protocol) or UDP (User Datagram Protocol), and various application layer protocols, e.g., HTTP (Hypertext Transfer Protocol) or VoIP (Voice over IP). The buffer splitter 13 may for example be provided on a level of a PDCP (Packet Data Convergence Protocol) layer. In an LTE implementation, the first MAC layer 12 may for example include an LTE RLC (Radio Link Control) and an LTE MAC sub-layer. Further, when using the WiFi radio link 22 for the unscheduled transmissions, the second MAC layer 12' may include a WiFi MAC sub-layer and optionally also a WiFi LLC (Logical Link Control) sub-layer. When using the further cellular radio link 23 for the unscheduled transmissions, the second MAC layer 12' may for example include an LTE RLC and an LTE MAC sub-layer, however operating on the basis of long lasting UL grants, e.g., SPS grants as defined in 3GPP TS 36.321 V12.3.0 (September 2014).

For uplink transmissions from the UE 10, data are received from the higher protocol layers 14 and buffered, e.g., in an input branch of the buffer splitter 13. The buffer splitter 13 distributes the data to the first MAC layer 12 and the second MAC layer 12', i.e., selects between a scheduled transmission on the cellular radio link 21 and an unscheduled transmission on the WiFi radio link 22 or the further cellular radio link 23. This may be accomplished individually for each data packet. Accordingly, data related to a certain IP flow, bearer, or QoS class may be distributed to the cellular radio link 21 and the WiFi radio link 22 or further cellular radio link 23, such that some data packets of this IP flow, bearer, or QoS class are transmitted by a scheduled transmission on the cellular radio link 21 while other data packets of this IP flow, bearer, or QoS class are transmitted by an unscheduled transmission on the WiFi radio link 22 or the further cellular radio link 23.

Figure 4:
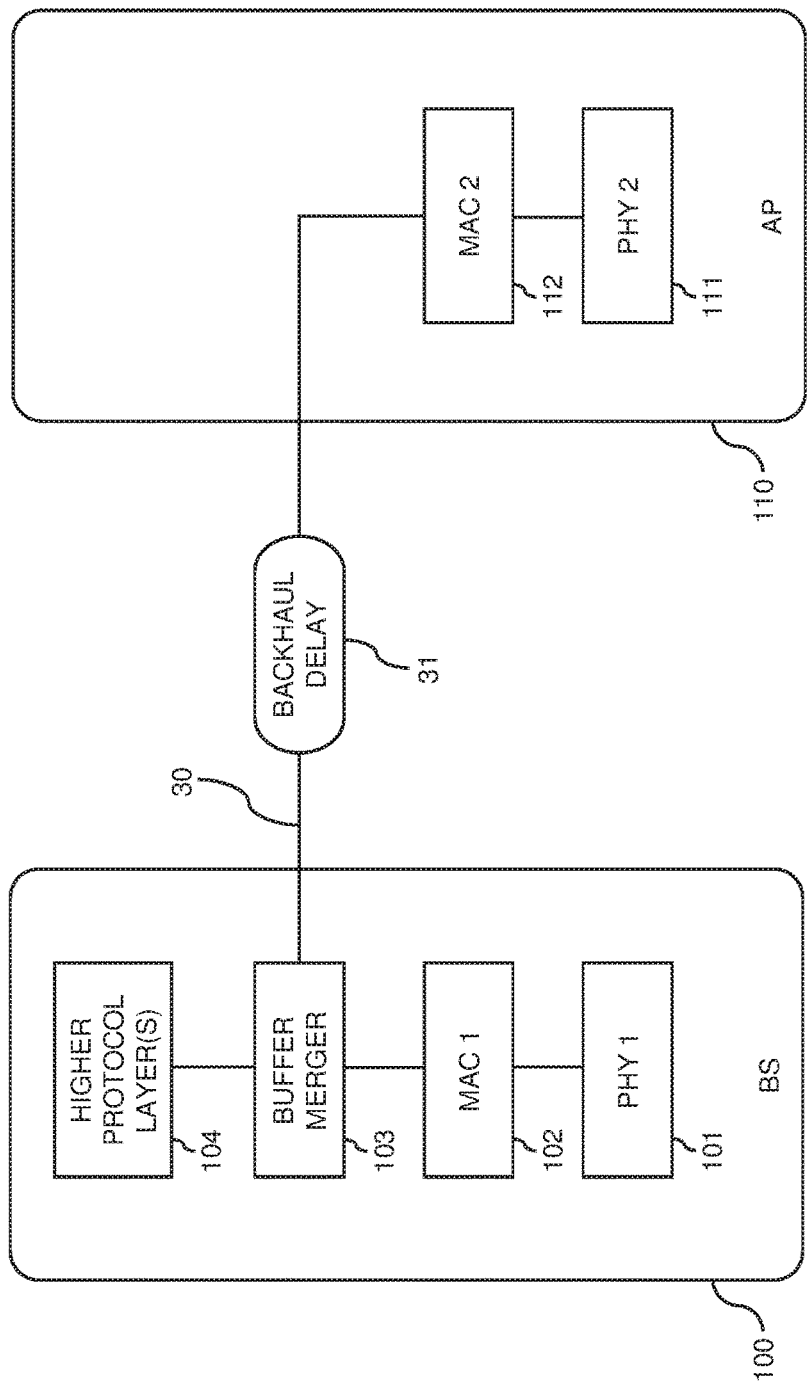
FIG. 4 shows an example of a network side protocol stack architecture according to an embodiment of the invention.

FIG. 4 schematically illustrates an exemplary protocol architecture which may be applied on the network side, assuming a scenario as illustrated in FIG. 1. In this example, the base station 100 is provided with a protocol stack organized in a first PHY 101 for the cellular radio link 21, a first MAC layer 102 for the cellular radio link 21, a buffer merger 103, and higher protocol layers 104. In an LTE implementation, the first MAC layer 102 may include an LTE RLC and an LTE MAC sub-layer. As explained for the UE 10, the higher protocol layers 114 may be based on the Internet Protocol, various transport protocols, such as TCP (Transmissions Control Protocol) or UDP (User Datagram Protocol), and various application layer protocols, e.g., HTTP (Hypertext Transfer Protocol) or VoIP (Voice over IP). The WLAN access point (AP) 110 is provided with a protocol stack organized in a second PHY 111 for the WiFi radio link 22 and a second MAC layer 112 for the WiFi radio link 22. The second MAC layer 112 may include a WiFi MAC sub-layer and optionally also a WiFi LLC (Logical Link Control) sub-layer. The second MAC 112 of the WLAN access point 110 is coupled via the backhaul link 30 to the buffer merger 103 of the base station 100. As schematically illustrated, transmissions over the backhaul link 30 may be associated with a certain backhaul delay 31. Similar to the buffer splitter of the UE 10, the buffer merger 103 may be provided on the level of the PDCP layer.

When using the further cellular radio link 23 for the unscheduled transmissions, a similar protocol architecture as illustrated in FIG. 4 may be utilized. However, in this case also the second MAC and the second PHY would be provided in the base station 100, and the backhaul link 30 would not be needed. In an LTE implementation, the second MAC layer of the base station 100 could then include an LTE RLC and an LTE MAC sub-layer, however operating on the basis of long lasting UL grants, e.g., SPS grants as defined in 3GPP TS 36.321 V12.3.0 (September 2014).

When receiving scheduled and unscheduled transmissions of data from the UE 10, the first MAC 102 and the second MAC 112 provide the data to the buffer merger, which may aggregate them to traffic of a single IP flow, bearer, or QoS class and then provide the aggregated traffic to the higher protocol layers 104. From the perspective of the higher protocol layers 104, the selective utilization of the scheduled transmissions and the unscheduled transmissions may thus be accomplished in a transparent manner.

In the following, exemplary processes of selecting between the scheduled transmission and the unscheduled transmission will be explained in more detail. Such processes may for example be implemented by the above-mentioned buffer splitter 13 of the UE 10.

As mentioned above, the scheduled transmission is associated with a delay due to the need to request allocation of radio resources before the radio transmission can be performed, and such delay may be avoided by rather using an unscheduled transmission. For example, an unscheduled transmission via the WiFi radio link 22 may be performed immediately when the medium was sensed to be free at least the DIFS, which may for example be as short as 28 μs. On the other hand, the medium of the WiFi radio link 22 may be busy, and thus a delay will occur until the radio transmission on the WiFi radio link 22 can be performed. Further, the unscheduled transmission via the WiFi radio link 22 may experience the above-mentioned backhaul delay due to the need to transmit the data from the WLAN access point 110 via the backhaul link 30 to the base station 100. Moreover, the medium used for the unscheduled transmissions may share radio resources for uplink and downlink transmissions, which means that excessive usage of the unscheduled transmissions may have an impact on the downlink transmissions on the shared radio resources, resulting in a reduction of achievable downlink data throughput and/or overall data throughput. The latter effect may for example be specifically relevant when uplink data throughput and downlink data throughput are closely related due to the utilization of a retransmission mechanism and/or a rate control mechanism in the higher protocol layers, such as a TCP retransmission mechanism and/or a TCP rate control mechanism.

Figure 5:
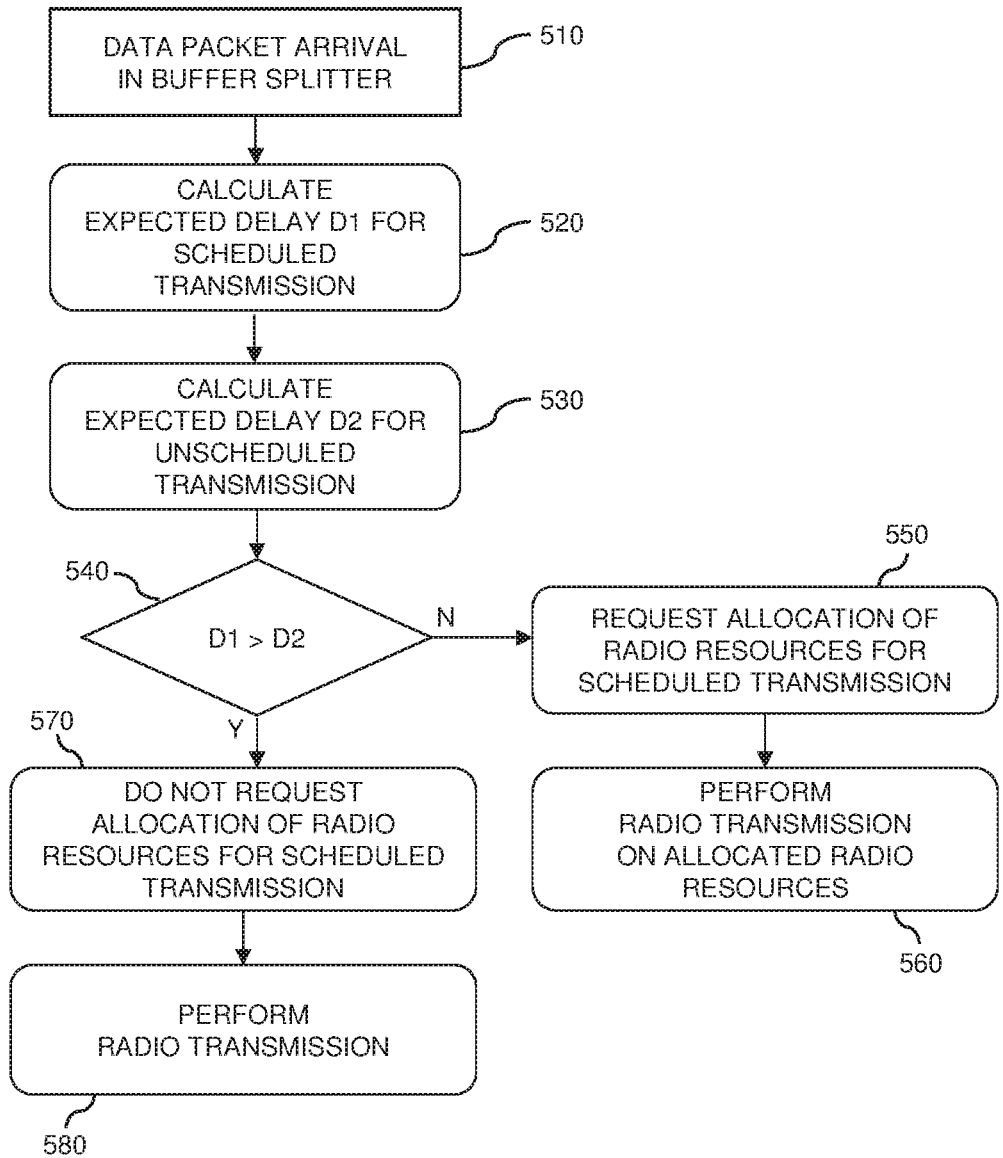
FIG. 5 shows a flowchart for illustrating processes according to an embodiment of the invention, in which selection between a scheduled transmission and an unscheduled transmission is based on expected delays.

In processes as illustrated by FIG. 5, the selection between the scheduled transmission and the unscheduled transmission is based on a delay expected D1 expected for the scheduled transmission and a delay D2 expected for the unscheduled transmission.

At step 510, a data packet arrives at the buffer splitter 13 of the UE 10. The data packet may for example be part of an IP flow, bearer, or QoS class handled by the higher protocol layers 14.

At step 520, an expected delay D1 for the scheduled transmission is calculated. The delay D1 can be defined a transmission delay of a data unit, e.g., a TCP segment or PDCP data unit, from a transmitting entity to a receiving entity. For the considered uplink transmission direction, the transmitting entity would reside in the UE while the receiving entity resides in the base station 100 or other network node to which the data is forwarded from the base station. For the sake of simplicity, the it may however be preferable to calculate only the delay D1 between the buffer splitter 13 in the UE 10 and the buffer merger 103 in the base station 100.

The calculation of the delay D1 may be accomplished by the UE 10 using information configured in the UE 10 and/or information indicated from the cellular network to the UE 10, e.g., estimated achievable throughput based on uplink channel quality measurements. Contributions considered in the calculation of the delay D1 may for example be a scheduling delay associated with the process of requesting allocation of radio resources, e.g., including sending of a SR and/or BSR by the UE 10, allocation of the radio resources on the network side, and indication of the allocated radio resources to the UE 10 in an UL grant, and a queuing delay.

At step 530, an expected delay D2 for the unscheduled transmission is calculated. The delay D2 should be defined in the same way as the delay D1, e.g., between the buffer splitter 13 in the UE 10 and the buffer merger 103 in the base station 100.

Also the calculation of the delay D2 may be accomplished by the UE 10 using information configured in the UE 10 and/or information indicated from the cellular network to the UE 10. Contributions considered in the calculation of the delay D2 may for example be the backhaul delay associated transmission of the data from the WLAN access point 110 to the base station 100, and a queuing delay.

In some implementations, at least a part of the calculation of the delay D1 and/or D2 may be performed on the network side and corresponding calculation results indicated to the UE 10. For example, the base station 100 could calculate the backhaul delay expected for the unscheduled transmission and indicate the backhaul delay to the UE 10. This variant may for example be useful for delay contributions which are not subject to significant variations over time.

At step 540, a comparison of the delays D1 and D2 is performed. In particular, it is determined whether the delay D1 exceeds the delay D2. If this is not the case, the scheduled transmission is preferable, and the UE 10 proceeds by transmitting the data by a scheduled transmission, as indicated by branch "N". As illustrated, this involves requesting allocation of radio resources at step 550, e.g., by sending a SR and/or BSR, and performing a radio transmission on the allocated radio resources at step 560.

If the delay D1 exceeds the delay D2, the UE 10 proceeds by transmitting the data by an unscheduled transmission, as indicated by branch "Y". As illustrated, in this case the UE 10 does not request allocation of radio resources, as indicated by step 570, and performs a radio transmission on radio resources for which such requesting of allocation is not necessary, as indicated by step 580. The radio resources used at step 580 may for example be radio resources of the WiFi radio link 22, which are shared by multiple stations using a contention based mechanism, or radio resources beforehand allocated to the UE 10, e.g., by a long lasting UL grant.

Figure 6:
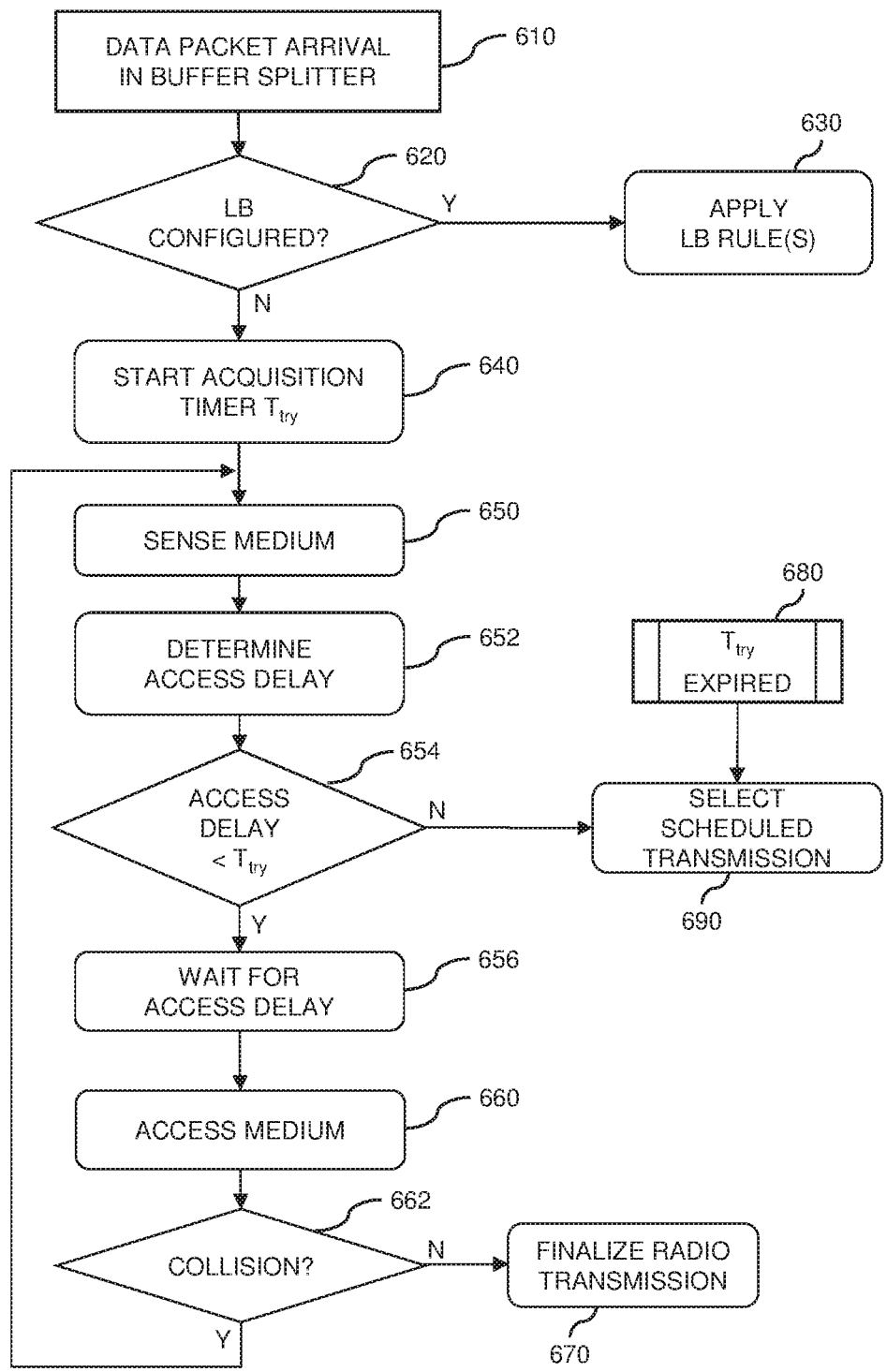
FIG. 6 shows a flowchart for illustrating processes according to an embodiment of the invention, in which selection between a scheduled transmission and an unscheduled transmission is based on a time needed for gaining access to a medium for performing the unscheduled transmission.

In processes as illustrated by FIG. 6, the selection between the scheduled transmission and the unscheduled transmission is based on defining a time limit until which the unscheduled transmission is preferred. If the unscheduled transmission can not be successfully performed before this time limit, the scheduled transmission is selected. In the processes of FIG. 6, in can be taken into account that the radio resources which are utilized for the unscheduled transmission may be shared and therefore not immediately accessible. The delay associated with the unscheduled transmission may thus be subject to considerable variations and be hard to estimate. For explanatory purposes it will be assumed that the WiFi radio link 22 is used for the unscheduled transmission and thus a corresponding contention-based mechanism is used for gaining access to the shared radio resources, in the following also referred to as medium. However, it is to be understood that similar processes could also be utilized in the case of other kinds of shared radio resources.

At step 610, a data packet arrives at the buffer splitter 13 of the UE 10. The data packet may for example be part of an IP flow, bearer, or QoS class handled by the higher protocol layers 14.

At step 620, it may be checked whether load balancing (LB) is configured for the scheduled transmissions and the unscheduled transmissions. If this is the case, as indicated by branch "Y", the UE 10 may apply configured load balancing rules to select between the scheduled transmission and the unscheduled transmission, as indicated by step 630. For example, such load balancing rules may aim at achieving a certain distribution of a load on the cellular radio link 21 and a load on the WiFi radio link 22, e.g., to keep the load on the cellular radio link 21 below a certain maximum limit by directing a part of the uplink traffic to the WiFi radio link 22. If the check of step 630 shows that no load balancing is configured, the processes continue with step 640, as indicated by branch "N". It is to be understood that steps 620 and 630 are optional and may be omitted if no load balancing is intended.

At step 640, an acquisition timer $T_{try}$ is started. The acquisition timer $T_{try}$ defines the above-mentioned time limit. That is to say, until expiry of the acquisition timer $T_{try}$ the UE 10 will attempt performing the unscheduled transmission. However, if it is not possible to gain access to the medium of the WiFi radio link 22 before expiry of the acquisition timer $T_{try}$, the UE 10 will rather select the scheduled transmission via the cellular radio link 21. The initial value of the acquisition timer $T_{try}$ may for example be selected to correspond to the scheduling delay expected on the cellular radio link 21 or a fraction thereof. This may for example be based on or correspond to a periodicity of opportunities at which the UE 10 may transmit a SR. In some scenarios, the value of the acquisition timer $T_{try}$ may be determined by the base station 100, e.g., depending on a load of the radio cell served by the base station 100, and then be indicated to the UE 10.

At step 650, the UE 10 senses whether the medium of the WiFi radio link 22 to determine whether the medium is idle.

At step 652, the UE 10 determines an access delay. If the medium is idle, the access delay corresponds to a backoff time and the DIFS. If the medium is not idle, the access delay corresponds to a deferral time until the medium becomes idle, plus a backoff time and the DIFS.

At step 654, the UE 10 checks whether the determined access delay is smaller than the current value of the acquisition timer $T_{try}$. If this is the case, as indicated by branch "Y", the UE 10 continues waiting for the determined access delay, as indicated by step 656.

At step 660, after the access delay, the UE 10 attempts to access the medium so as to perform a radio transmission on the WiFi radio link 22.

At step 662, the UE 10 checks whether there is a collision with another station accessing the medium. If this not the case, as indicated by branch "N", the UE 10 finalizes the radio transmission of the data at step 670, i.e., performs a radio transmission of the data via the WiFi radio link 22. If a collision is detected at step 662, the UE 10 stops the attempted radio transmission and initiates a new attempt to access the medium by returning to step 650.

If it is found at step 654 that the access delay is not smaller than the current value of the acquisition timer $T_{try}$, this indicates that the unscheduled transmission would no longer be preferable in terms of delay. Accordingly, the UE 10 may then select to perform a scheduled transmission to send the data at step 690, as indicated by branch "N".

Further, if during the above-mentioned processes the acquisition timer $T_{try}$ expires, as indicated by step 680, this will also trigger interrupting the attempts to access the medium and perform the unscheduled transmission and selecting the scheduled transmission at step 690.

When the scheduled transmission is selected at step 690, the UE 10 requests allocation of radio resources at step, e.g., by sending a SR and/or BSR, and performs a radio transmission on the allocated radio resources.

Figure 7:
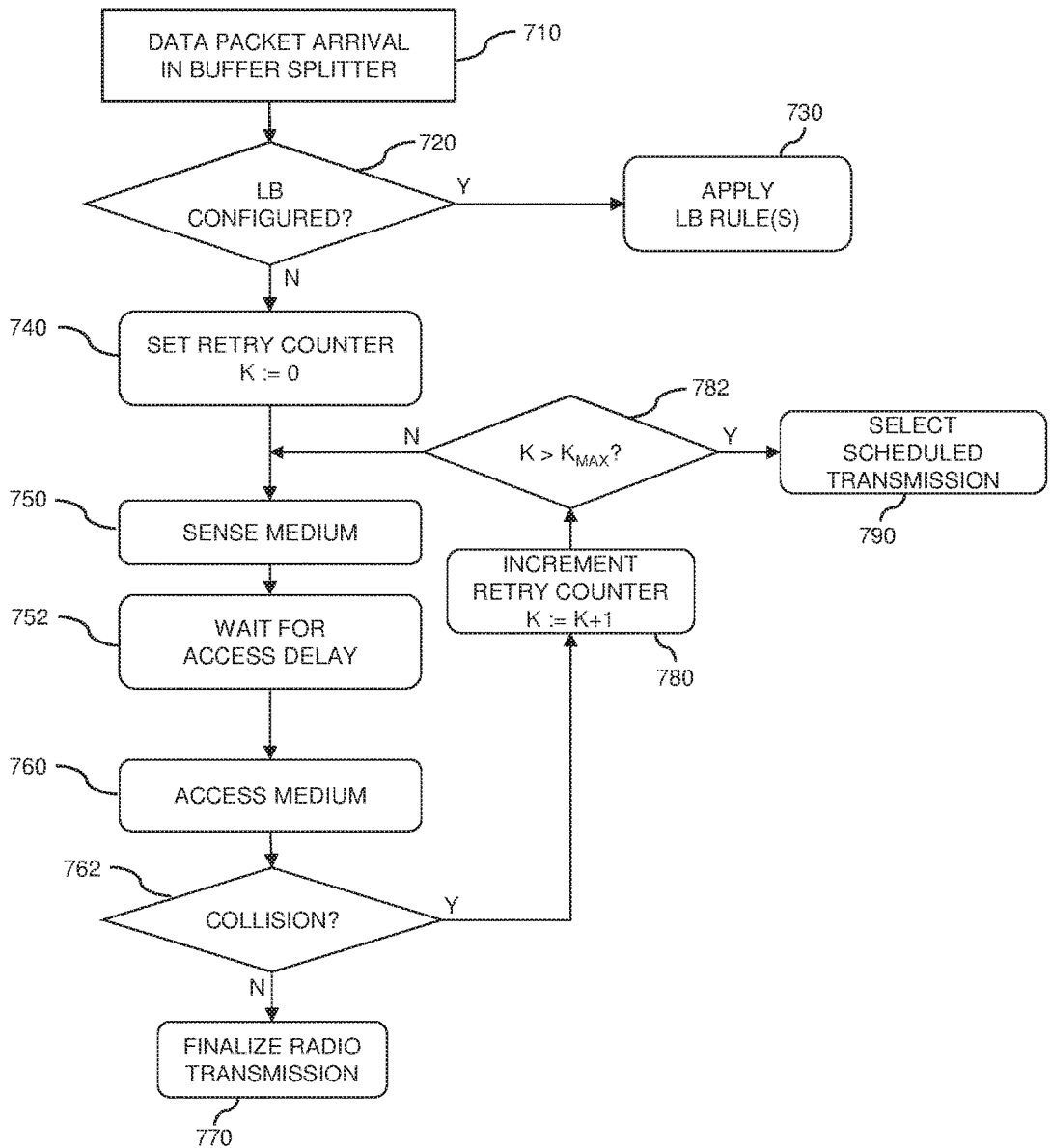
FIG. 7 shows a flowchart for illustrating processes according to an embodiment of the invention, in which selection between a scheduled transmission and an unscheduled transmission is based on a number of unsuccessful attempts of performing the unscheduled transmission.

In processes as illustrated by FIG. 7, the selection between the scheduled transmission and the unscheduled transmission is based on defining a maximum number of unsuccessful attempts to perform the unscheduled transmission. Also in the processes of FIG. 7, in can be taken into account that the radio resources which are utilized for the unscheduled transmission may be shared and therefore not immediately accessible. For explanatory purposes it will again be assumed that the WiFi radio link 22 is used for the unscheduled transmission and thus a corresponding contention-based mechanism is used for gaining access to the shared radio resources, in the following also referred to as medium. However, it is to be understood that similar processes could also be utilized in the case of other kinds of shared radio resources.

At step 710, a data packet arrives at the buffer splitter 13 of the UE 10. The data packet may for example be part of an IP flow, bearer, or QoS class handled by the higher protocol layers 14.

At step 720, it may be checked whether load balancing (LB) is configured for the scheduled transmissions and the unscheduled transmissions. If this is the case, as indicated by branch "Y", the UE 10 may apply configured load balancing rules to select between the scheduled transmission and the unscheduled transmission, as indicated by step 730. For example, such load balancing rules may aim at achieving a certain distribution of a load on the cellular radio link 21 and a load on the WiFi radio link 22, e.g., to keep the load on the cellular radio link 21 below a certain maximum limit by directing a part of the uplink traffic to the WiFi radio link 22. If the check of step 630 shows that no load balancing is configured, the processes continue with step 740, as indicated by branch "N". It is to be understood that steps 720 and 730 are optional and may be omitted if no load balancing is intended.

At step 740, a retry counter K is initialized by setting it to an initial value of K=0. The retry counter is used to count the number of unsuccessful attempts to perform the unscheduled transmission via the WiFi radio link 22. That is to say, until a maximum number $K_{MAX}$ of unsuccessful attempts is reached, the UE 10 will attempt performing the unscheduled transmission. However, when the retry counter K exceeds the configured maximum number $K_{MAX}$, the UE 10 will rather select the scheduled transmission via the cellular radio link 21. In some scenarios, the maximum number $K_{MAX}$ may be determined by the base station 100, e.g., depending on a load of the radio cell served by the base station 100, and then be indicated to the UE 10.

At step 750, the UE 10 senses whether the medium of the WiFi radio link 22 to determine whether the medium is idle.

At step 752, the UE 10 waits for an access delay. If the medium is idle, the access delay corresponds to a backoff time and the DIFS. If the medium is not idle, the access delay corresponds to a deferral time until the medium becomes idle, plus a backoff time and the DIFS.

At step 760, after the access delay, the UE 10 attempts to access the medium so as to perform a radio transmission on the WiFi radio link 22.

At step 762, the UE 10 checks whether there is a collision with another station accessing the medium. If this not the case, as indicated by branch "N", the UE 10 finalizes the radio transmission of the data at step 770, i.e., performs a radio transmission of the data via the WiFi radio link 22. If a collision is detected at step 762, the UE 10 stops the attempted radio transmission and initiates a new attempt to access the medium.

As illustrated by step 780, before proceeding to the new attempt to access the medium, the UE 10 increments the retry counter K. At step 782, the UE 10 then checks whether the retry counter K exceeds the configured maximum number $K_{MAX}$. If this is not the case, as indicated by branch "N", the UE 10 returns to step 750 for the new attempt to access the medium. However, if it is found at step 782 that the retry counter exceeds the configured maximum number $K_{MAX}$, this indicates that the unscheduled transmission would no longer be preferable. Accordingly, the UE 10 may then select to perform a scheduled transmission to send the data at step 790, as indicated by branch "Y".

When the scheduled transmission is selected at step 790, the UE 10 requests allocation of radio resources at step, e.g., by sending a SR and/or BSR, and performs a radio transmission on the allocated radio resources.

As compared to the processes of FIG. 6, utilization of the retry counter in the processes of FIG. 7 does not set a fixed time after which the scheduled transmission will be selected. Rather, the time after which the selection of the scheduled transmission will occur may vary depending on the backoff time used in the attempts.

In the above scenarios, the data transmitted by the UE 10 in the scheduled transmissions and the unscheduled transmissions may originate from a single common transmit buffer, e.g., on the level of the PDCP layer, and the buffer splitter 13 may operate to distribute the data to two separate transmit buffers, a first transmit buffer for the scheduled transmissions and a second transmit buffer for the unscheduled transmissions. The data in the second transmit buffer may then be disregarded in the process of requesting allocation of radio resources for a scheduled transmission. That is to say, data being available in the second transmit buffer would not trigger sending a SR or BSR. Further, the amount of data available for transmission as indicated in a BSR may exclude the data in the second transmit buffer, i.e., be based on only the data in the first transmit buffer. In this way, it can be avoided that radio resources are allocated for data which end up being transmitted in an unscheduled transmission and the efficiency of radio resource utilization thus be improved. In some scenarios, the BSR may also be based on the data in the common transmit buffer. For example, a certain limit could be defined for the amount of data in the common transmit buffer, e.g., in terms of certain fraction of a maximum buffer size, and only the data in excess of this limit could be considered in the BSR. Such behavior could for example be configured by RRC configuration. For example, the RRC configuration could indicate the limit to be applied on the common transmit buffer.

In some scenarios, the unscheduled transmissions may be performed on radio resources which are shared for the downlink transmission direction and the uplink transmission direction, e.g., using a TDD (Time Division Duplex) scheme. For example, such sharing of radio resources is typically applied for WiFi radio links, such as the WiFi radio link 22. In such scenarios, excessive usage the shared radio resources by the unscheduled transmissions in the uplink transmission direction may result in a reduction of achievable data throughput in the downlink transmission direction and also to a reduction of achievable overall data throughput for both transmission directions. In some scenarios, it may thus be preferable to select the scheduled transmission if a certain downlink or overall data throughput is desired for the UE 10. An exemplary scenario where this may be the case is a TCP congestion avoidance phase during a TCP connection. In a typical TCP connection, low latency is beneficial at the start of the TCP connection, during a phase referred to as "TCP slow start". After that, in the TCP congestion avoidance phase, typically a high data throughput is desired. Accordingly, it may be beneficial to prioritize the unscheduled transmissions during the TCP slow start phase to minimize the delay, e.g., using processes as described in connection with FIGS. 5 to 7, and to prioritize the scheduled transmission during the TCP congestion avoidance. During the TCP congestion avoidance phase, the UE 10 may for example check if the radio resources used for the unscheduled transmissions are shared for the downlink transmission directions and/or if selecting the unscheduled transmission for an uplink transmission will reduce the data throughput which can be achieved in the downlink transmission direction, e.g., by considering the load on the shared radio resources. The load may for example be assessed in terms of a percentage of occupation of the shared radio resources. If a reduction of the data throughput can be expected, e.g., because the load on the shared radio resources exceeds a limit, the UE 10 may prefer the scheduled transmission over the unscheduled transmission.

In some scenarios, the selection between the scheduled transmissions and the unscheduled transmissions may also be based on the load on the radio resources used for the scheduled transmissions and the load on the radio resources used for the unscheduled transmissions. The UE 10 may then for example select the less loaded radio resources to achieve load balancing and optimize performance, e.g., as mentioned in connection with steps 630 and 730. As can be seen from the processes of FIGS. 6 and 7, such load balancing processes may override other selection process based on expected delay or number of unsuccessful transmission attempts. In some scenarios, such load balancing could also be achieved by dynamically adapting the parameters of other prioritization processes, e.g., by parameters used in the calculation of the delays D1 and D2, by adapting the value of the acquisition timer $T_{try}$, or by adapting the maximum number $K_{MAX}$ of unsuccessful attempts to perform an unscheduled transmission.

Figure 8:
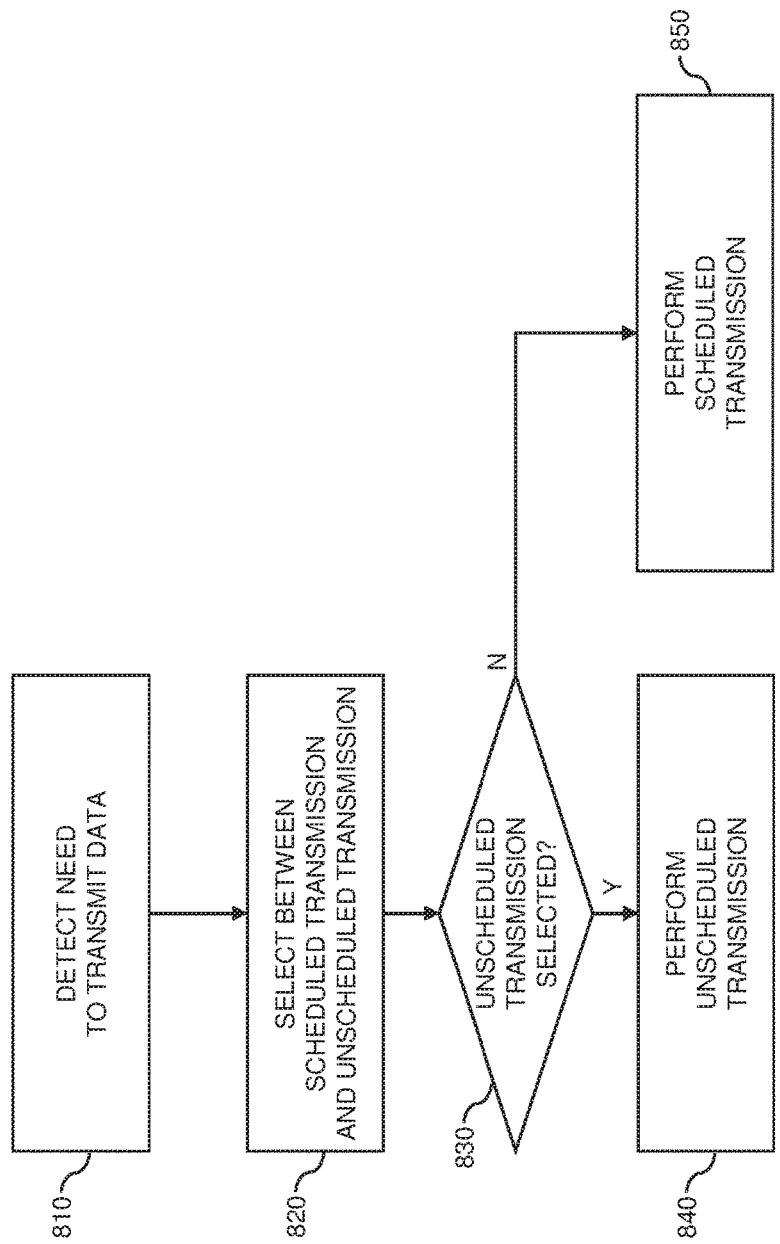
FIG. 8 shows a flowchart for schematically illustrating a method according to an embodiment of the invention.

FIG. 8 shows a flowchart for illustrating a method of controlling radio transmissions, which may be utilized for implementing the illustrated concepts. The radio transmissions are applied for transmitting data from a communication device, such as the UE 10, to an access node of a cellular network, such as the base station 100. The method is assumed to be performed by the communication device which performs the radio transmissions. If a processor-based implementation of the communication device is used, the steps of the method may be performed by one or more processors of the communication device.

At step 810, the communication device detects a need to transmit data to the access node. For example, this need may be detected on the basis of arrival of data in a transmit buffer of the device. This transmit buffer may for example be provided on the input of the buffer splitter 13 of FIG. 3.

At step 820, the communication device performs a selection between a scheduled transmission of the data to the access node and an unscheduled transmission of the data to the access node.

The selection between the scheduled transmission and the unscheduled transmission may be is based on an estimation of a delay associated with the scheduled transmission and/or on an estimation of a delay associated with the unscheduled transmission. Specifically, the selection between the scheduled transmission and the unscheduled transmission may be based on a comparison of the delay associated with the scheduled transmission to the delay associated with the unscheduled transmission. An example of such selection process was explained in connection with FIG. 5. Here, it is to be noted that the estimation of the delay associated with the scheduled transmission and/or of the delay associated with the unscheduled transmission may be performed by the communication device, or may be performed at least partially on the network side, e.g., by the access node.

In some scenarios, the selection between the scheduled transmission and the unscheduled transmission may also involve that the communication device first selects the unscheduled transmission then selects the scheduled transmission in response to an unsuccessful attempt of performing the unscheduled transmission. This may for example involve that the communication device selects the scheduled transmission if it was not possible to perform the unscheduled transmission within a given time limit. An example of such process was explained above in connection with FIG. 6. Further, this may involve that the communication device selects the unscheduled transmission if a maximum number of unsuccessful attempts to perform the unscheduled transmission is reached. An example of such process was explained above in connection with FIG. 7.

In some scenarios, the selection between the scheduled transmission and the unscheduled transmission may also be based on a load of the cellular network. Here, in particular a load on the radio resources to be potentially used in the scheduled transmission may be considered. For example, a load on a cell served by the access node in terms of a utilization percentage of available uplink radio resources of the cell could be considered. In addition or as an alternative, the selection between the scheduled transmission and the unscheduled transmission is based on a load on the further radio resources, e.g., in terms of occupancy of the radio resources by the communication device and optionally also by other devices. Further, the load could also be considered in terms of load balancing considerations. For example, if there is a high amount of data available for transmission, e.g., a high fill level of the above-mentioned common transmit buffer or a high filling rate of the common transmit buffer, the selection may aim at distributing the load over scheduled transmissions and unscheduled transmissions, e.g., to meet a certain load target for the radio resources used for the scheduled transmission and/or for the further radio resources used for the unscheduled radio resources.

In some scenarios, the selection between the scheduled transmission and the unscheduled transmission may also be based on an estimation of achievable data throughput between the communication device and the access node. The data throughput may be estimated separately for the scheduled transmission and the unscheduled transmission. The scheduled transmission may for example be selected in response to if the achievable data throughput when selecting the unscheduled transmission is not sufficient.

In some scenarios, the selection between the scheduled transmission and unscheduled transmission may also be based on an estimated reduction of achievable data throughput between the access node and the communication device by downlink radio transmissions on the further radio resources when selecting the unscheduled transmission. As mentioned above, in some scenarios selection of the unscheduled transmission may reduce the data throughput which can be achieved by downlink radio transmissions on the further radio resources. This may in turn also affect the overall data throughput which can be achieved, e.g., when the data throughput in the uplink and the downlink transmission direction are closely related due to the utilization of a retransmission mechanism or rate control mechanism. In such cases, the scheduled transmission may for example be selected if an excessive reduction of the achievable data throughput by downlink radio transmissions can be expected when selecting the unscheduled transmission. This may for example be useful during a TCP congestion avoidance phase.

In some scenarios, the selection between the scheduled transmission and the unscheduled transmission may also be based on a selection priority configured in the communication device. For example, such selection priority could be preconfigured to dynamically configured by the cellular network.

It is to be understood that the above-mentioned various kinds of selection criteria may be used as alternatives or in combination. Further, also rules could be defined when to apply one or more of the above-mentioned criteria.

At branching step 830, if the unscheduled transmission was selected, as indicted by branch "Y", the method proceeds to step 840 where the communication device performs the unscheduled transmission. Otherwise, as indicated by branch "N", the method proceeds to step 850 where the communication device performs the scheduled transmission.

The scheduled transmission of step 850 involves that the communication device requests allocation of radio resources by the cellular network, e.g., by sending a SR and/or a BSR, that in response to this requesting, the communication device receives an indication of allocated radio resources from the cellular network, e.g., in an UL grant, and that the communication device performs a radio transmission on the allocated radio resources to send the data to the access node. The scheduled transmission may be performed via a radio link from the communication device to the access node, such as via the above-mentioned cellular radio link from the UE 10 to the base station 100.

The unscheduled transmission of step 840 involves that the communication device performs a radio transmission on further radio resources to send the data to the access node, without requesting allocation of radio resources by the cellular network. The radio transmission on the further radio resources may be based on a contention mechanism to avoid colliding usage of the further radio resources. Such further radio resources may be configured beforehand in the communication device. In some scenarios, the further radio resources may also be indicated to the communication device before detecting the need to transmit the data at step 810, e.g., by a long lasting UL grant, such as an SPS grant. The unscheduled transmission may be performed via a further radio link from the communication device to a WLAN access point and a backhaul link from the WLAN access point to the access node, such as via the above-mentioned WiFi radio link 22 from the UE 10 to the WLAN access point 110 and the above-mentioned backhaul link between the WLAN access point 110 and the base station 100. In some scenarios, the unscheduled transmission may also be performed via a further radio link from the communication device to the access node, such as via the above-mentioned further cellular radio link 23 from the UE 10 to the base station 100.

Accordingly, in view of the functionalities as explained above, a communication device may include a module for detecting the need to transmit data, as described in connection with step 810, a module for performing the selection between the scheduled transmission and the unscheduled transmission, as described in connection with step 820, a module for performing the unscheduled transmission, as described in connection with step 840, and a module for performing the scheduled transmission, as described in connection with step 850.

Figure 9:
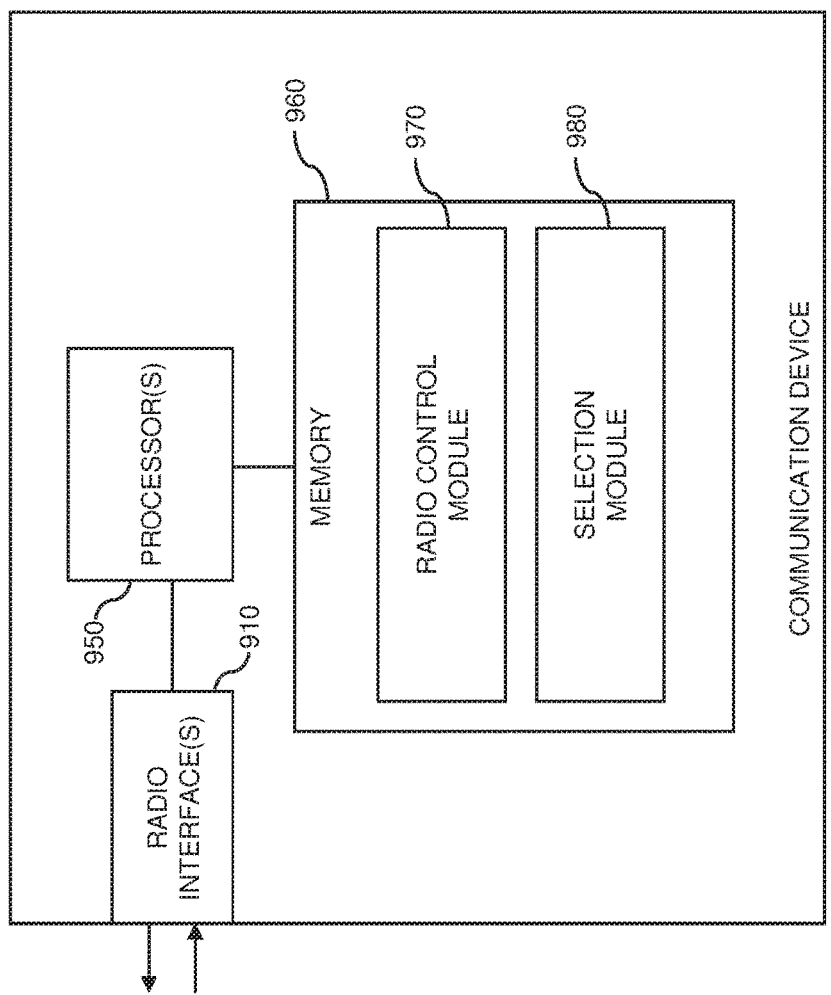
FIG. 9 schematically illustrates a communication device according to an embodiment of the invention.

FIG. 9 illustrates exemplary structures which may be used for implementing the above concepts in a communication device, such as the above-mentioned UE 10.

As illustrated, the communication device may include at least one radio interface 910 for performing the radio transmissions. The radio interface 910 is assumed to support the scheduled transmissions using radio resources allocated by a cellular network on an as-needed basis, i.e., when requested by the communication device, and the unscheduled transmissions using further radio resources which can be utilized by the communication device without a dedicated request for allocation of radio resources. The further radio resources may for example radio resources of a WiFi radio link, such as the WiFi radio link 22, or radio resources allocated by a long lasting UL grant, such as an SPS grant. In some implementations, the communication device may also include separate radio interfaces for performing the scheduled transmissions and the unscheduled radio transmissions.

Further, the communication device may include one or more processors 950 coupled to the radio interface(s) 910, and a memory 960 coupled to the processor(s) 950. The memory 960 may include a Read Only Memory (ROM), e.g., a flash ROM, a Random Access Memory (RAM), e.g., a Dynamic RAM (DRAM) or Static RAM (SRAM), a mass storage, e.g., a hard disk or solid state disk, or the like. The memory 960 includes suitably configured program code to be executed by the processor(s) 950 so as to implement the above-described functionalities of the communication device. In particular, the memory 960 may include various program code modules for causing the communication device to perform processes as described above, e.g., corresponding to the method steps of FIG. 8.

As illustrated, the memory 960 may include a radio control module 970 for implementing the above-described functionalities of performing radio transmissions, as part of a scheduled transmission or as part of an unscheduled transmission, e.g., as explained in connection with steps 840, 850 of FIG. 8. Further, the memory 960 may include a selection module 980 for implementing the above-described functionalities of selecting between the scheduled transmission and the unscheduled transmission, e.g., as explained in connection with step 820 of FIG. 8.

It is to be understood that the structures as illustrated in FIG. 9 are merely schematic and that the communication device may actually include further components which, for the sake of clarity, have not been illustrated, e.g., further interfaces or processors. Also, it is to be understood that the memory 960 may include further types of program code modules, which have not been illustrated, e.g., program code modules for implementing known functionalities of a UE. According to some embodiments, also a computer program may be provided for implementing functionalities of the communication device, e.g., in the form of a physical medium storing the program code and/or other data to be stored in the memory 960 or by making the program code available for download or by streaming.

As can be seen, the concepts as described above may be used for efficiently utilizing both scheduled transmissions and unscheduled transmissions to a cellular network. In this way an improved performance for transmissions in the uplink direction may be achieved, e.g., in terms of higher data throughput or lower latency. Further, also the downlink transmission direction may benefit from the improved performance in the uplink transmission direction.

It is to be understood that the examples and embodiments as explained above are merely illustrative and susceptible to various modifications. For example, the illustrated concepts may be applied in connection with various radio technologies, without limitation to the above-mentioned example of 3GPP cellular radio technology and WiFi radio technology. Further, various mechanisms may be utilized for implementing the allocation of the radio resources as used in the scheduled transmissions on an as needed basis, e.g., by using explicit requests for allocation of the radio resources or implicit indications of the need to transmit data. Further, various mechanisms may be utilized for controlling utilization of the radio resources in the unscheduled transmissions, including various kinds of contention based media sharing and collision avoidance mechanisms. Moreover, it is to be understood that the above concepts may be implemented by using correspondingly designed software to be executed by one or more processors of an existing device, or by using dedicated device hardware.

The invention claimed is:

1. A method of controlling radio transmissions in a cellular network, the method being performed in a communication device and the method comprising:
    detecting a need to transmit a data element of a protocol to an access node of the cellular network;
    in response to detecting said need, selecting between a scheduled transmission of the data element to the access node and an unscheduled transmission of the data element to the access node, wherein the selection between the scheduled transmission and the unscheduled transmission is based on a defined time limit for which the unscheduled transmission is prioritized over the scheduled transmission, and wherein the selecting comprises selecting the scheduled transmission when a delay associated with the unscheduled transmission is greater than the defined time limit;
    in response to selecting the scheduled transmission:
        requesting allocation of radio resources by the cellular network;
        receiving an indication of allocated radio resources from the cellular network; and
        performing a radio transmission of the data element to the access node using the allocated radio resources; and
    in response to selecting the unscheduled transmission, performing a radio transmission of the data element to the access node using further radio resources without requesting allocation of radio resources by the cellular network.

2. The method according to claim 1,
    wherein the radio transmission on the further radio resources is based on a contention mechanism to avoid colliding usage of the further radio resources.

3. The method according to claim 1,
    wherein the further radio resources are indicated to the communication device before detecting said need to transmit the data element.

4. The method according to claim 1,
    wherein the selection between the scheduled transmission and the unscheduled transmission is further based on an estimation of a delay associated with the scheduled transmission.

5. The method according to claim 4,
    wherein the selection between the scheduled transmission and the unscheduled transmission is further based on a comparison of the delay associated with the scheduled transmission to the delay associated with the unscheduled transmission.

6. The method according to claim 1,
    wherein the selection between the scheduled transmission and the unscheduled transmission is further based on a load of the cellular network.

7. The method according to claim 1,
    wherein the selection between the scheduled transmission and the unscheduled transmission is further based on a load on the further radio resources.

8. The method according to claim 1,
    wherein the selection between the scheduled transmission and the unscheduled transmission is further based on an estimation of achievable data throughput between the communication device and the access node.

9. The method according to claim 1,
    wherein the selection between the scheduled transmission and the unscheduled transmission is further based on an estimated reduction of achievable data throughput between the access node and the communication device by downlink radio transmissions on the further radio resources in response to the selection of the unscheduled transmission.

10. The method according to claim 1,
    wherein the selection between the scheduled transmission and the unscheduled transmission is further based on a selection priority configured in the communication device.

11. The method according to claim 1, further comprising:
    in response to an unsuccessful attempt of performing the unscheduled transmission using the further radio resources, selecting the scheduled transmission.

12. The method according to claim 1,
    wherein the scheduled transmission is performed via a radio link from the communication device to the access node.

13. The method according to claim 12,
    wherein the unscheduled transmission is performed via a further radio link from the communication device to a Wireless Local Area Network access point and a backhaul link from the Wireless Local Area Network access point to the access node.

14. The method according to claim 12,
    wherein the unscheduled transmission is performed via a further radio link from the communication device to the access node.

15. A communication device, comprising:
    at least one radio interface; and
    at least one processor, the at least one processor being configured to:
        detect a need to transmit a data element of a protocol via the at least one radio interface to an access node of a cellular network;
        in response to detecting said need, select between a scheduled transmission of the data element to the access node and an unscheduled transmission of the data element to the access node, wherein the selection between the scheduled transmission and the unscheduled transmission is based on a defined time limit for which the unscheduled transmission is prioritized over the scheduled transmission, and wherein, to select between the scheduled transmission and the unscheduled transmission, the at least one processor is configured to select the scheduled transmission when a delay associated with the unscheduled transmission is greater than the defined time limit;
        in response to selecting the scheduled transmission:
            request allocation of radio resources by the cellular network, receive an indication of allocated radio resources from the cellular network, and perform a radio transmission of the data element to the access node using the allocated radio resources; and in response to selecting the unscheduled transmission, perform a radio transmission of the data element to the access node using further radio resources, without requesting allocation of radio resources by the cellular network.

16. The communication device according to claim 15, wherein the radio transmission on the further radio resources is based on a contention mechanism to avoid colliding usage of the further radio resources.

17. The communication device according to claim 15, wherein the further radio resources are indicated to the communication device before detecting said need to transmit the data element.

18. The communication device according to claim 15, wherein the selection between the scheduled transmission and the unscheduled transmission is further based on an estimation of a delay associated with the scheduled transmission.

19. The communication device according to claim 18, wherein the selection between the scheduled transmission and the unscheduled transmission is further based on a comparison of the delay associated with the scheduled transmission to the delay associated with the unscheduled transmission.

20. The communication device according to claim 15, wherein the selection between the scheduled transmission and the unscheduled transmission is further based on a load of the cellular network.

21. The communication device according to claim 15, wherein the selection between the scheduled transmission and the unscheduled transmission is further based on a load on the further radio resources.

22. The communication device according to claim 15, wherein the selection between the scheduled transmission and the unscheduled transmission is further based on an estimation of achievable data throughput between the communication device and the access node.

23. The communication device according to claim 15, wherein the selection between the scheduled transmission and the unscheduled transmission is further based on an estimated reduction of achievable data throughput between the access node and the communication device by downlink radio transmissions on the further radio resources in response to the selection of the unscheduled transmission.

24. The communication device according to claim 15, wherein the selection between the scheduled transmission and the unscheduled transmission is further based on a selection priority configured in the communication device.

25. The communication device according to claim 15, wherein the at least one processor is further configured to:
in response to an unsuccessful attempt of performing the unscheduled transmission using the further radio resources, select the scheduled transmission.

26. The communication device according to claim 15, wherein the scheduled transmission is performed via a radio link from the communication device to the access node.

27. The communication device according to claim 26, wherein the unscheduled transmission is performed via a further radio link from the communication device to a Wireless Local Area Network access point and a backhaul link from the Wireless Local Area Network access point to the access node.

28. The communication device according to claim 26, wherein the unscheduled transmission is performed via a further radio link from the communication device to the access node.

29. The communication device according to claim 15, wherein the at least one processor is configured to perform the steps of the method according to claim 1.

30. A non-transitory computer-readable medium storing a computer program comprising program instructions that, when executed by processing circuitry of a communication device having at least one radio interface, configure the communication device to:

detect a need to transmit a data element of a protocol via the at least one radio interface to an access node of a cellular network;

in response to detecting said need, select between a scheduled transmission of the data element to the access node and an unscheduled transmission of the data element to the access node, wherein the selection between the scheduled transmission and the unscheduled transmission is based on a defined time limit for which the unscheduled transmission is prioritized over the scheduled transmission, and wherein, to select between the scheduled transmission and the unscheduled transmission, the program instructions configure the communication device to select the scheduled transmission when a delay associated with the unscheduled transmission is greater than the defined time limit;

in response to selecting the scheduled transmission:
request allocation of radio resources by the cellular network,
receive an indication of allocated radio resources from the cellular network, and
perform a radio transmission of the data element to the access node using the allocated radio resources; and in response to selecting the unscheduled transmission, perform a radio transmission of the data element to the access node using further radio resources, without requesting allocation of radio resources by the cellular network.

31. The method according to claim 1, wherein detecting the need to transmit the data element to the access node comprises detecting an arrival of the data element in a transmit buffer of the communication device.

32. The method according to claim 1, further comprising: if the unscheduled transmission using the further radio resources cannot be performed successfully after a defined number of attempts, selecting the scheduled transmission.

* * * * *